(12) United States Patent
Hidalgo et al.

(10) Patent No.: US 8,975,363 B2
(45) Date of Patent: *Mar. 10, 2015

(54) USE, AS A SHOCK ABSORBER, OF A MATERIAL FORMED FROM BRANCHED MOLECULES CONTAINING ASSOCIATIVE GROUPS

(75) Inventors: Manuel Hidalgo, Brignais (FR); Nicolas Dufaure, Bernay (FR); Jean-Luc Couturier, Lyons (FR); Bruno Hemelryck, Chaponost (FR)

(73) Assignee: Arkema France, Colombes (FR)

( * ) Notice: Subject to any disclaimer, the term of this patent is extended or adjusted under 35 U.S.C. 154(b) by 250 days.

This patent is subject to a terminal disclaimer.

(21) Appl. No.: 13/254,282

(22) PCT Filed: Mar. 29, 2010

(86) PCT No.: PCT/FR2010/050567
§ 371 (c)(1),
(2), (4) Date: Oct. 11, 2011

(87) PCT Pub. No.: WO2010/112743
PCT Pub. Date: Oct. 7, 2010

(65) Prior Publication Data
US 2012/0022221 A1    Jan. 26, 2012

(30) Foreign Application Priority Data

Apr. 2, 2009 (FR) ..................... 09 52126

(51) Int. Cl.
C08G 69/34 (2006.01)
C08G 63/12 (2006.01)
C08G 83/00 (2006.01)

(52) U.S. Cl.
CPC ............. C08G 63/12 (2013.01); C08G 83/005 (2013.01); C08G 83/008 (2013.01)

USPC ................... 528/339.3; 528/295.3; 528/297; 528/335; 528/345; 528/339; 528/350; 528/364

(58) Field of Classification Search
None
See application file for complete search history.

(56) References Cited

U.S. PATENT DOCUMENTS

| | | | |
|---|---|---|---|
| 6,403,724 B1 | 6/2002 | Wang | |
| 6,867,256 B1 | 3/2005 | Di Silvestro | |
| 7,250,487 B2 * | 7/2007 | Tournilhac et al. | 528/422 |
| 8,530,671 B2 * | 9/2013 | Tournilhac et al. | 548/324.5 |
| 2004/0161394 A1 * | 8/2004 | Mougin et al. | 424/70.11 |
| 2008/0152607 A1 * | 6/2008 | Malle et al. | 424/64 |
| 2010/0135940 A1 * | 6/2010 | Grimaldi et al. | 424/62 |
| 2011/0003872 A1 * | 1/2011 | Tournilhac et al. | 514/383 |
| 2011/0034593 A1 * | 2/2011 | Gonzalez Leon et al. | 524/59 |
| 2011/0059280 A1 * | 3/2011 | Montarnal et al. | 428/36.9 |

FOREIGN PATENT DOCUMENTS

| | | | |
|---|---|---|---|
| FR | 2766197 A1 | | 1/1999 |
| FR | 2925505 A1 * | | 6/2009 |
| FR | 2930777 A1 * | | 11/2009 |
| WO | 96/07688 A1 | | 3/1996 |
| WO | WO 2009/081065 A2 * | | 7/2009 |

OTHER PUBLICATIONS

International Search Report received in PCT/FR2010/050567 mailed Jun. 10, 2010. English translation provided.

* cited by examiner

Primary Examiner — Robert Sellers
(74) Attorney, Agent, or Firm — Smith, Gambrell & Russell, LLP

(57) ABSTRACT

A shock absorber is prepared from a material formed from branched molecules comprising associative groups. The branched molecules each contains at least bifunctional fragments and at least trifunctional fragments joined together by ester or thioester bridges alone or in combination with amide or urea bridges.

20 Claims, 1 Drawing Sheet

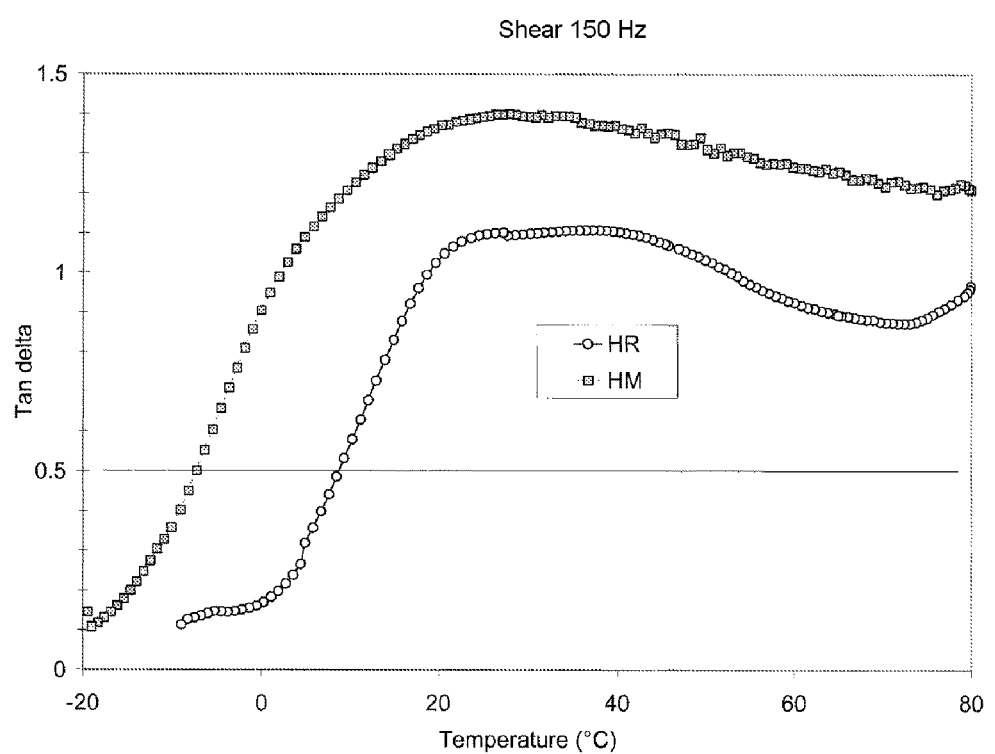

USE, AS A SHOCK ABSORBER, OF A MATERIAL FORMED FROM BRANCHED MOLECULES CONTAINING ASSOCIATIVE GROUPS

The present invention relates to the field of shock-absorbing materials and more particularly to the use, as shock absorber, of a material formed of arborescent molecules comprising associative groups.

Shock-absorbing materials are well known to a person skilled in the art. Mention may generally be made of thermoplastic elastomer materials, such as block copolymers, for example SBCs (styrene block copolymers), or thermoset (vulcanized) materials, such as crosslinked natural rubber or also synthetic rubber, such as BR, SBR or NBR (butadiene rubber, styrene-butadiene rubber or nitrile-butadiene rubber). Mention may more particularly be made, among these materials, of copolymers based on EVA, polynorbornenes or polyurethanes. These materials have numerous applications, in particular as structural components of footwear soles, of gloves, of bulletproof jackets, of shooting targets, in particular for arrows, bullets or darts, but also of coatings for tool handles, of groundsheets or of antivibration components.

Due to these numerous possible applications, there exists a constant need for novel products capable of absorbing shocks, that is to say exhibiting good damping properties.

A subject matter of the invention is thus the use, as shock absorber, of a specific material formed of arborescent molecules comprising associative groups.

This specific material includes molecules exhibiting a specific arborescent structure which confers on them damping properties, which can vary according to the proportion of the reactants used for their synthesis, and other properties. Thus, depending on the number of reactive functional groups present on the starting compounds and on the number of reactive functional groups remaining on conclusion of the first stage of synthesis, numbers which can easily be adjusted by the choice of the starting materials and by the use of an appropriate stoichiometric ratio, it is possible to obtain, according to preference and in a controlled way, a semicrystalline or amorphous solid, a viscoelastic liquid or even an elastomer material which may be thermoplastic. More specifically, when the mean functionality of the monomers is relatively low, essentially linear molecules having a viscoelastic behavior and which may optionally exhibit a semicrystalline or amorphous solid phase are produced, whereas networks optionally comprising an insoluble fraction and exhibiting elastomer properties are formed when this functionality is high.

It is thus possible to obtain materials exhibiting not only a good ability to absorb shocks but also a compromise in properties, such as a good capability for self-repairing, good creep strength and good fluidity during the processing thereof.

The term "use as shock absorber" of a material as defined above will be understood, within the meaning of the invention, as meaning the use of the damping capabilities of the specific material as defined above, including molecules exhibiting an arborescent structure.

The term "damping" is understood to mean, within the meaning of the invention, a damping as measured by the tangent delta (also known as loss factor) of the material of greater than or equal to 0.5 or preferably of greater than 1 at the temperature of use, said tangent delta being calculated as the ratio of the dynamic loss modulus (in shear or in elongation, G" or E") to the dynamic storage modulus (in shear or in elongation, G' or E'). These dynamic moduli are obtained by dynamic mechanical analysis (DMA) measurements or by dynamic measurements in a rheometer, at frequencies of greater than 50 Hz and preferably of greater than or equal to 100 Hz. Measurements of this type are well known to a person skilled in the art and have been widely described in the literature, for example in the work entitled "Viscoelastic properties of polymers" by J. D. Ferry, 3rd edition, Wiley, 1980.

The term "shock-absorbing" should be understood within the broad sense, that is to say both as capable of absorbing and of dissipating the kinetic energy created, for example, by sound waves or also by the impact between any object and the specific material defined above. This term should also be understood in the sense of an overall antivibratory effect.

It is also possible to obtain a material having not only shock-absorbing properties but also the properties of a thermoplastic elastomer, that is to say of a material capable, at ambient temperature, of being able to be subjected to a uniaxial strain, advantageously of at least 20% for 15 minutes, and of then recovering, once the stress has been released, its initial dimension, with a set of less than 5% of its initial dimension, and which can be shaped or reshaped at high temperature. In addition, it has been observed that this material can be self-healing, that is to say capable, once cut, torn or scratched, of being repaired by simply bringing the fractured surfaces into contact without requiring heating or the application of a high pressure or the carrying out of any chemical reaction, the material thus repaired retaining elastomer properties.

The material can be obtained according to a process consisting in reacting, in a first stage, a first compound including a high proportion of at least trifunctional molecules with a second compound carrying one or more associative groups, in nonstoichiometric proportions which allow free functional groups to remain on the first compound, in order to obtain a material which is reacted, in a second stage, with an at least bifunctional compound.

A subject matter of the present invention is thus the use, as shock absorber, of a material comprising arborescent molecules each composed of at least bifunctional fragments and of at least trifunctional fragments joined to one another via ester or thioester bridges, alone or in combination with amide or urea bridges, said bridges being formed from two functional groups carried by different fragments, said molecules additionally comprising, on the fragments situated at the ends of the arborescences, end associative groups capable of combining with one another via hydrogen bonds and connected covalently to the functional groups not participating in said bridges.

According to a preferred embodiment of the invention, this material is capable of being obtained according to the process comprising the following successive stages:

(a) the reaction of at least one at least trifunctional compound (A) carrying first and second functional groups with at least one compound (B) carrying, on the one hand, at least one reactive group capable of reacting with the first functional groups of (A) and, on the other hand, at least one associative group;

(b) the reaction of the compound(s) obtained in stage (a) with at least one at least bifunctional compound (C), the functional groups of which are capable of reacting with the second functional groups of the compound (A) in order to form ester or thioester bridges, alone or in combination with amide or urea bridges. The material comprising arborescent molecules is curable at a temperature of from 120° C. to 150° C. for 1 to 48 hours.

The term "arborescent" is understood to mean, according to the invention, a branched molecule, the backbone of which comprises at least two branches. This definition does not exclude various branches of the same molecule being able to join up again to form loops.

It is possible for a fraction of the arborescent molecules according to the invention to be insoluble both in water and in any organic solvent.

The term "associative groups" is understood to mean groups capable of combining with one another via hydrogen bonds, advantageously via 1 to 6 hydrogen bonds. Examples of associative groups which can be used according to the invention are the imidazolidonyl, triazolyl, triazinyl, bisureyl and ureido-pyrimidyl groups. It is preferable for the mean number of the end associative groups per molecule of the material to be at least 3. It is advantageously at most 6. The associative groups are connected covalently to the molecule. The term "covalently" is understood to mean that the associative groups are connected to the end functional groups of the molecule either via a direct bond or, preferably, via a chain, in particular an alkylene chain.

The terms "reactive groups" or "functional groups" are understood to mean chemical functional groups capable of reacting with other chemical functional groups to form covalent bonds, resulting in particular in the formation of ester, thioester, amide, urea or urethane bridges and in particular of ester and amide bridges. A "bifunctional" compound denotes a compound carrying two identical or different reactive functional groups. An "at least trifunctional" compound denotes a compound carrying at least three identical or different reactive functional groups.

The term "fragment" is understood to mean, within the meaning of the invention, a unit of a molecule situated between two or three bridges as defined above. A "bifunctional" fragment is capable of being obtained from a bifunctional compound and a "trifunctional" fragment is capable of being obtained from a trifunctional compound. The arborescent molecules according to the invention comprise at least bifunctional fragments, advantageously bifunctional fragments, and at least trifunctional fragments, advantageously trifunctional fragments.

The compound (A) employed in the first stage of the process according to the invention can in particular carry at least three identical or different functional groups chosen from acid, ester or acyl chloride functional groups. It advantageously comprises from 5 to 100, preferably from 12 to 100 and more preferably from 24 to 90 carbon atoms.

The compound (A) can, in the first stage of the process according to the invention, occur as a mixture with mono- and bifunctional compounds, such as mono- and diacids, in particular fatty acid mono- and dimers.

It is preferable to use trimers (oligomers of 3 identical or different monomers) and mixtures of dimers and trimers of fatty acids of vegetable origin. These compounds result from the oligomerization of unsaturated fatty acids, such as: undecylenic, myristoleic, palmitoleic, oleic, linoleic, linolenic, ricinoleic, eicosenoic or docosenoic acid, which are usually found in pine (tall oil fatty acids), rapeseed, corn, sunflower, soybean, grape seed, linseed or jojoba oils, and eicosapentaenoic and docosahexaenoic acids, which are found in fish oils.

Mention may be made, as examples of trimers of fatty acids, of the compounds with the following formulae which illustrate the cyclic trimers resulting from fatty acids comprising 18 carbon atoms, it being known that the compounds available commercially are mixtures of steric isomers and of positional isomers of these structures, optionally partially or completely hydrogenated.

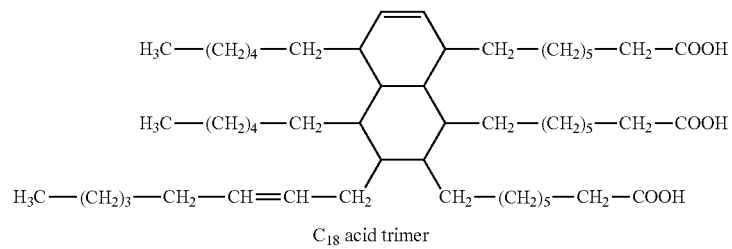

$C_{18}$ acid trimer

It is thus possible to use a mixture of oligomers of fatty acids comprising dimers, trimers and monomers of linear or cyclic $C_{18}$ fatty acids, said mixture being predominantly of dimers and trimers and comprising a low percentage (usually less than 5%) of monomers. Preferably, said mixture comprises:

from 0.1 to 40% by weight, preferably from 0.1 to 5% by weight, of monomers of identical or different fatty acids,
from 0.1 to 99% by weight, preferably from 18 to 85% by weight, of dimers of identical or different fatty acids, and
from 0.1 to 90% by weight, preferably from 5 to 85% by weight, of trimers of identical or different fatty acids.

Mention may be made, as examples of mixtures of dimers/trimers of fatty acids (% by weight), of:

Pripol® 1017 from Uniqema, a mixture of 75-80% of dimers and 18-22% of trimers with of the order of 1-3% of fatty acid monomers,
Pripol® 1048 from Uniqema, a 50/50% mixture of dimers/trimers,
Pripol® 1013 from Uniqema, a mixture of 95-98% of dimers and of 2-4% of trimers with 0.2% maximum of fatty acid monomers,
Pripol® 1006 from Uniqema, a mixture of 92-98% of dimers and of a maximum of 4% of trimers with 0.4% maximum of fatty acid monomers,
Pripol® 1040 from Uniqema, a mixture of fatty acid dimers and trimers with at least 75% of trimers and less than 1% of fatty acid monomers,
Unidyme® 60 from Arizona Chemicals, a mixture of 33% of dimers and of 67% of trimers with less than 1% of fatty acid monomers,
Unidyme® 40 from Arizona Chemicals, a mixture of 65% of dimers and of 35% of trimers with less than 1% of fatty acid monomers,
Unidyme® 14 from Arizona Chemicals, a mixture of 94% of dimers and of less than 5% of trimers and other higher oligomers with of the order of 1% of fatty acid monomers,
Empol® 1008 from Cognis, a mixture of 92% of dimers and of 3% of higher oligomers, essentially trimers, with of the order of 5% of fatty acid monomers, Empol® 1018 from Cognis, a mixture of 81% of dimers and of 14% of higher oligomers, essentially trimers, with of the order of 5% of fatty acid monomers, Radiacid® 0980 from Oleon, a mixture of dimers and trimers with at least 70% of trimers.

The Pripol®, Unidyme®, Empol® and Radiacid® products comprise monomers of $C_{18}$ fatty acids and oligomers of fatty acids corresponding to multiples of $C_{18}$.

According to an alternative form of the invention, instead of triacids, it is possible to use, as compound (A), a compound including at least three ester or acyl chloride functional groups.

Mention may be made, as example of ester, of a methyl, ethyl or isopropyl (preferably methyl) ester of a fatty acid trimer or of a mixture of oligomers of fatty acids as defined above.

In yet another alternative form, the compound (A) can be an at least trifunctional compound including at least two different functional groups advantageously chosen from acid, ester and acyl chloride functional groups.

For its part, the compound (B) carries at least one reactive group which can in particular be chosen from alcohol or primary or secondary amine groups. In an alternative form, the compound (B) can carry at least two such identical or different groups.

In the case in particular where the reactive group of the compound (B) is capable of reacting both with the first and second functional groups of the compound (A), it is preferable, in the first stage of the process according to the invention, for the ratio of the number of the reactive groups of the compound (B) to the sum of the functional groups of the compound (A) to range from 0.1:1 to 0.8:1 and preferably from 0.3:1 to 0.8:1.

The compound (B) can thus correspond to any one of the formulae (B1) to (B3):

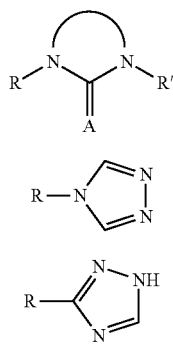

where:
R denotes a unit comprising at least one alcohol or primary or secondary amine group,
R' denotes a hydrogen atom,
A denotes an oxygen or sulfur atom or an —NH group, preferably an oxygen atom.

Preferred examples of compounds (B) are (2-amino-ethyl) imidazolidone (UDETA), 1-(2-[(2-aminoethyl)-amino]ethyl)imidazolidone (UTETA), 1-[2-({2-[(2-amino-ethyl)amino]ethyl}amino)ethyl]imidazolidone (UTEPA), 3-amino-1,2,4-triazole and 4-amino-1,2,4-triazole.

Mention may be made, as example of compounds capable of being obtained on conclusion of the first stage of the process described above, of:

UDe 1008, resulting from the reaction between Empol® 1008 and UDETA;
UDe 1060, resulting from the reaction between Unidyme® 60 and UDETA;
UDe 1060/1008, resulting from the reaction between Empol® 1008, Unidyme® 60 and UDETA;
UDe 1017, resulting from the reaction between Pripol® 1017 and UDETA;
UDe 1048, resulting from the reaction between Pripol® 1048 and UDETA;
UDe 1014, resulting from the reaction between Unidyme® 14 and UDETA;
UDe 1040, resulting from the reaction between Pripol® 1040 and UDETA;
UDe 0980, resulting from the reaction between Radiacid® 0980 and UDETA.

According to the starting fatty acid, a compound is obtained which can be semicrystalline with a melting point (M.p.) generally of between 30 and 150° C. and which has a glass transition temperature (TO generally of between −50° C. and 20° C.

This compound is then reacted, in the second stage of the process according to the invention, with an at least bifunctional compound (C), in such a way that the functional groups of (C) react with the second functional groups, that is to say the remaining reactive functional groups, of the compound (A). In this stage, the use of catalytic conditions capable of resulting in a homopolymerization of the compound (C) will be avoided.

The compound (C) carries at least two identical or different functional groups chosen in particular from epoxy, alcohol and amine functional groups.

The compound (C) is preferably a diepoxide. It can thus be chosen from: bisphenol A diglycidyl ether, bisphenol F diglycidyl ether, tetrabromobisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, polytetramethylene glycol diglycidyl ether, resorcinol diglycidyl ether, neopentyl glycol diglycidyl ether, bisphenol A polyethylene glycol diglycidyl ether, bisphenol A polypropylene glycol diglycidyl ether, terephthalic acid diglycidyl ester, epoxidized polyunsaturated fatty acids and epoxidized limonene; and their mixtures.

In an alternative form, the compound (C) can be a polyepoxide including at least three epoxide functional groups chosen, for example, from: castor oil triglycidyl ether, 1,1,1-tris(hydroxymethyl)propane triglycidyl ether, trisphenol triglycidyl ether, glycerol triglycidyl ether, glycerol propoxylate triglycidyl ether, glycerol ethoxylate triglycidyl ether, trimethylolpropane triglycidyl ether, sorbitol polyglycidyl ether, polyglycerol polyglycidyl ether, pentaerythritol polyglycidyl ether, poly(glycidyl acrylate), polyglycidyl methacrylate, epoxidized polyunsaturated fatty acids, epoxidized vegetable oils, epoxidized fish oils and their mixtures.

In another alternative form, the compound (C) can be a diol. In this case, the compound (C) can be chosen from: ethylene glycol, propylene glycol, tetramethylene glycol, hexamethylene glycol, octanediol, nonanediol, decanediol, diethylene glycol, dipropylene glycol, triethylene glycol, tetraethylene glycol, polyethylene glycol, polypropylene glycol, polytetramethylene glycol, polyesters comprising hydroxyl ends, polybutadienes comprising hydroxyl ends, polydimethyl-siloxanes comprising hydroxyl ends, polyisobutylenes comprising hydroxyl ends, polybutadiene-co-acrylonitrile copolymers comprising hydroxyl ends, dimer diols resulting from fatty acids and their mixtures.

According to another possibility, the compound (C) can be a polyol including at least three alcohol functional groups. Examples of such compounds are in particular: sugars, such as sorbitol, pentaerythritol, trimethylol-propane, and also glycerol and its ethoxylated and propoxylated derivatives, castor oil and dimer diols resulting from fatty acids, such as Pripol 2033 from Uniqema.

It is understood that the material according to the invention comprises connecting bridges, preferably amide bridges, formed in the first stage of its process of synthesis by reaction of the reactive groups (advantageously primary or secondary amine groups) of the compound (B) with reactive functional groups, referred to as "first functional groups" (advantageously acid functional groups), of the compound (A) and connecting bridges (advantageously ester bridges) formed in the second stage of this process by reaction of the remaining reactive functional groups (preferably acid functional groups), referred to as "second functional groups", of the compound (A) with reactive functional groups (advantageously epoxy functional groups) of the compound (C). This material also includes hydrogen bonds between the associative groups carried by the molecules which constitute it. The presence of these reversible hydrogen bonds, capable of being split by a rise in temperature and of reforming at ambient temperature, allows the material according to the invention to exhibit a melt fluidity sufficient to be converted by methods well known to a person skilled in the art (injection molding, molding, extrusion, and the like) and optionally a high elongation at break at ambient temperature, without, however, it exhibiting a high molecular weight.

The arborescent molecules constituting said material include a soluble fraction and optionally an insoluble fraction, that is to say a fraction which represents from 0.1 to 90% of the weight of the material and which is not soluble in any proportion in any solvent. The number-average molecular weight of the soluble fraction is preferably between 300 and 300 000 g/mol, as measured by GPC.

According to one embodiment of the invention, the mean number of end associative groups per molecule is at least 1.2, preferably at least 2, indeed even at least 2.2.

It is furthermore understood that this material can include molecules other than the arborescent molecules described above, in particular in the case where the compound (A) includes trimers of fatty acids mixed with mono- and/or dimers of fatty acids. Advantageously, the material according to the invention includes at least 25% by number and better still at least 50% by number of said arborescent molecules.

It is preferable according to the invention for this material to also include intermolecular hydrophobic bonds, advantageously due to interactions between alkyl groups carried by each of the arborescent molecules described above. The term "alkyl" is understood to mean, within the meaning of the invention, side groups ($C_nH_{2n+1}$) and not alkylene chains ($C_nH_{2n}$), for example. In a particularly preferred way, each of these molecules comprises $C_6$-$C_{24}$ alkyl chains, advantageously in a greater number than said end associative groups. They can in particular be contributed by the (A) compounds, in particular when they are trimers of fatty acids.

The compounds (A), (B) and (C) described above can be introduced, in the process according to the invention, in the molten state or by the solvent route.

The proportions of (A), (B) and (C) used in the process according to the invention determine the mechanical characteristics of the material according to the invention.

The material as defined above exhibits high shock-absorbing capabilities over a broad temperature range.

It thus preferably exhibits a tangent delta greater than 0.5, at a frequency of at least 50 Hz and preferably of greater than or equal to 100 Hz, over a temperature range extending from 20 to 50° C. and even, for some materials, over a temperature range extending from −5° C. to 80° C. or more.

Advantageously, the material additionally exhibits elastomer properties, that is to say the property of being able to be subjected to a uniaxial strain at ambient temperature and of recovering, once this stress has been relaxed, its initial dimension, with a set of less than 10% and preferably of less than 5% of its initial dimension, according to the strain initially applied.

Furthermore, it is preferable for the material according to the invention to exhibit self-repairing properties. This term means the ability of the material, after cutting, such as that resulting from an elongation extending to break or such as that carried out by scissors or another slicing or shearing tool, or also any other contactless cutting method, such as laser cutting, followed by bringing into contact, at ambient temperature, the faces of the material where breaking has occurred, to be reunited and to be able to be again subjected to tension.

As recalled above, the proportions and the nature of (A), (B) and (C) used in the process according to the invention determine the mechanical characteristics of the material according to the invention.

It is consequently preferable for the material according to the invention to be such that:
  the compound (A) is a trimer of at least one of the following acids: undecylenic acid, myristoleic acid, palmitoleic acid, oleic acid, linoleic acid, linolenic acid, ricinoleic acid, eicosenoic acid, docosenoic acid, eicosapentaenoic acid and decosahexa-enoic acid,
  the compound (B) is chosen from: (2-amino-ethyl)imidazolidone (UDETA), 1-(2-[(2-aminoethyl)-amino]ethyl)imidazolidone (UTETA), 1-[2-({2-[(2-amino-ethyl)amino]ethyl}amino)ethyl]imidazolidone (UTEPA), 3-amino-1,2,4-triazole and 4-amino-1,2,4-triazole, and
  the compound (C) is chosen from: bisphenol A diglycidyl ether, bisphenol F diglycidyl ether, tetrabromobisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, polytetramethylene glycol diglycidyl ether, resorcinol diglycidyl ether, neopentyl glycol diglycidyl ether, bisphenol A polyethylene glycol diglycidyl ether, bisphenol A polypropylene glycol diglycidyl ether, terephthalic acid diglycidyl ester, castor oil triglycidyl ether, 1,1,1-tris(hydroxymethyl)propane triglycidyl ether, trisphenol triglycidyl ether, glycerol triglycidyl ether, glycerol propoxylate triglycidyl ether, glycerol ethoxylate triglycidyl ether, trimethylolpropane triglycidyl ether, sorbitol polyglycidyl ether, polyglycerol polyglycidyl ether, pentaerythritol polyglycidyl ether, poly(glycidyl acrylate), polyglycidyl methacrylate, epoxidized polyunsaturated fatty acids, epoxidized vegetable oils, epoxidized fish oils, epoxidized limonene and their mixtures.

The shock-absorbing capabilities of the material can be adjusted by the choice of the compound C, for a given proportion of the compounds A, B and C. Thus, the shock-absorbing capabilities of the material are very high when the compound C is chosen from: epoxidized soybean oil, bisphenol A diglycidyl ether or bisphenol F diglycidyl ether.

The material can in particular be used to manufacture any type of object intended to dampen impacts or vibrations, such as bumpers and fenders for ground vehicles, in particular trains, trucks, cars or carriages, including fork-lift trucks, but also guards for boats, play mats, bulletproof jackets, shooting targets, in particular for arrows, bullets and darts, sports protective gear, in particular leg guards, elbow guards, gloves, linings for one-piece sports clothing and protective helmets, or protective components for pipes and piping, or to manufacture items intended to dissipate the energy created by sound waves, such as acoustic blankets.

In these applications, the material according to the invention can be used as is or in single-phase or multiphase mixtures with one or more compounds, such as petroleum fractions, solvents, inorganic and organic fillers, plasticizers, tackifying resins, antioxidants, pigments and/or dyes, for example in emulsions, suspensions or solutions.

A better understanding of the invention will be obtained in the light of the following examples, given only for illustrative purposes and which do not have the aim of restricting the scope of the invention, defined by the appended claims.

The invention is also illustrated by FIG. 1, which represents the change in the tangent delta of the products of example 4 (HR) and of example 5 (HM) as a function of the temperature in ° C. for shearing at 150 Hz.

EXAMPLES

Example 1

Preparation of a Material According to the Invention 1300 g of a trimer of fatty acids (Pripol® 1040, acid number=188 (mg of KOH/g), i.e. 4.36 mol of acid functional groups) were introduced into a 4 liter glass reactor equipped with a mechanical stirrer, a temperature probe, an inlet for nitrogen via a dip pipe, a dropping funnel, a Dean & Stark apparatus surmounted by a condenser, and a heating mantle. 299 g of (2-aminoethyl)imidazolidone (UDETA, base number=7.3 meq/g, i.e. 2.18 mol, 0.5 equivalent) were introduced into the dropping funnel in the molten state. The reactor was heated to 80° C. and then the UDETA was run in over a period of 10 minutes with stirring and under a nitrogen stream. The temperature gradually rose to 180° C. over a period of 4 hours and the mixture was then left to react at 180° C. for 2 hours. The amount of water recovered was 39 g (2.18 mol). The mixture was left to cool to 130° C. to recover 1475 g of a brown viscous liquid which solidified at ambient temperature. The acid number (mg KOH/g of product necessary to neutralize the acid groups) of the product obtained was 67.5 mg of KOH/g.

7.5 g of this product were then placed, with 1.73 g of Araldite® LY556 (BADGE epoxy prepolymer with a mean number of hydroxyl groups per molecule of n=0.15, i.e. a number-average molecular weight Mn=382.6), in a PTFE beaker with a diameter of 5 cm. After heating the beaker to 150° C., the mixture was homogenized using a spatula and then poured into a PTFE mold with a diameter of 8 cm maintained at 150° C. for 1 hour and then at 125° C. for 48 hours. The mold was then cooled to ambient temperature. After removing from the mold, a flexible film of material, referred to as RH-4, with a thickness of approximately 1 mm at the center, was obtained. After cutting up with a razor blade, it was found that this film was spontaneously restored when the pieces were brought into contact within a period of less than 1 hour.

Example 2

Preparation of a Material According to the Invention

The procedure was the same as in example 1, using 1625 g of Pripol® 1040 (acid number=188 mg of KOH/g, i.e. 5.46 mol of acid functional groups) and 224.4 g of UDETA (1.64 mol, 0.3 equivalent). 26.5 g of water (1.64 mol) and 1770 g of a brown viscous liquid, which solidified at ambient temperature, were recovered. The acid number of the product was 105.8 mg of KOH/g.

7.75 g of this product were then placed, with 2.8 g of Araldite® LY556, in a PTFE mold with a diameter of 8 cm. After heating the mold to 150° C., the mixture was homogenized using a spatula and maintained at 150° C. for hour and then at 125° C. for 48 hours. The mold was then cooled to ambient temperature. After removing from the mold, a flexible film having a thickness of approximately 1.5 mm at the center was obtained. After cutting up with a razor blade, it was found that this film was spontaneously restored when the pieces were brought into contact within a period of less than 1 hour.

Example 3

Preparation of a Material According to the Invention 5.62 g of acid dimer/trimer mixture Unidyme® 60 and 1.40 g of (2-aminoethyl)imidazolidinone (UDETA) with a molar purity of greater than 95% were poured into a 50 ml three-necked round-bottomed flask equipped with a heating magnetic stirrer, a gas inlet and a connection which allows the system to be placed under vacuum. The mixture was heated, flushed with a stream of nitrogen, at 180° C. for 12 hours. A slight vacuum was regularly applied with a water pump in order to remove the water dissolved in the medium. The liquid mixture was cooled to 150° C. and then 1.91 g of epoxy resin Araldite® LY556 were added. After staying at 150° C. for 45 min, the mixture was poured into a PTFE mold with a diameter of 8 cm and placed in an oven at 125° C. for 48 hours.

The sample obtained after removal from the mold existed in the form of an elastic film with a thickness of 1.6 mm.

Example 4

Preparation of a Material According to the Invention 1000 g of Pripol® 1040 from Unigema® (acid number 186), i.e. 3.32 mol of carboxylic acid, and 245 g of UDETA with a purity by weight of 87.6%, i.e. 1.66 mol of amine, are introduced into a Schott reactor with a working volume of 4000 ml positioned on an electrical heating mantle and equipped with a temperature probe, a mechanical stirrer with a polytetrafluoroethylene rotor of anchor type, a dropping funnel, a reflux condenser, a Dean & Stark apparatus and a nitrogen inlet terminated by a polytetrafluoroethylene dip pipe. It is assumed that the impurities of the UDETA can contribute the equivalent of an additional 0.13 mol. The mixture is heated at 170° C. in order to remove the water of condensation. When the water of condensation has been removed and trapped in the Dean & Stark apparatus, the medium is cooled to 80° C. 294 g of an epoxy resin of BADGE type, Epikote® 828 EL from Resolution® (epoxy content of 5.2 mol/kg), i.e. 1.53 mol, are added at 80° C. and the mixture is left stirring at 80° C. for 15 minutes. The product thus obtained is emptied from the reactor and can be stored without curing in polypropylene containers. In order to obtain the final shock-absorbing material, curing is carried out in an oven at 120° C. for 24 hours, preferably as a layer with a thickness of 5 mm on a nonadherent support, such as plates covered with polytetrafluoroethylene.

Example 5

Preparation of a Material According to the Invention 1000 g of Pripol® 1040 from Unigema® (acid number 186), i.e. 3.32 mol of carboxylic acid, and 245 g of UDETA with a purity by weight of 87.6%, i.e. 1.66 mol of amine, are introduced into a Schott reactor with a working volume of 4000 ml positioned on an electrical heating mantle and equipped with a temperature probe, a mechanical stirrer with a polytetrafluoroethylene rotor of anchor type, a dropping funnel, a reflux condenser, a Dean & Stark apparatus and a nitrogen inlet terminated by a polytetrafluoroethylene dip pipe. It is assumed that the impurities of the UDETA can contribute the equivalent of an additional 0.13 mol. The mixture is heated at 170° C. in order to remove the water of condensation. When the water of condensation has been removed and trapped in the Dean & Stark apparatus, the medium is cooled to 120° C. 414 g of epoxidized soybean oil Ecepox® PB 3 from Arkema (epoxy content of 3.7 mol/kg), i.e. 1.53 mol, are added at 120° C. and the mixture is left stirring at 120° C. for 15 minutes. The product thus obtained is emptied from the reactor and can be stored without curing in polypropylene containers. In order to obtain the final hybrid elastomeric material, curing is carried out in an oven at 120° C. for 48 hours, preferably as a layer with a thickness of 5 mm on a nonadherent support, such as plates covered with polytetrafluoroethylene. The product is tacky and can be treated with talcum powder at the surface in order to facilitate the handling thereof and in particular the measurement of mechanical properties.

Example 6

Mechanical Tests

Test specimens in the shape of dumbbells with the following dimensions: total length: 35 mm, total width: 6.5 mm, length of the central region: 10 mm, width of the central region: 2 mm, thickness: 1.6 mm, were obtained by punching, using a hollow punch, of the film obtained in example 3.

The tensile tests were carried out at 25° C. using an Instron® tensile testing machine, equipped with a 10 N force sensor, at a rate of 2 mm/min. They gave the following results:
Strain at break: 427%
Breaking stress: 0.65 MPa
A tensile set test was carried out at 25° C. as follows, using the same machine: the test specimen was marked with two lines on either side of the central region, the image of the test specimen was recorded using a scanner with a resolution of 600 dpi and the distance between the two lines was measured on the image, and then the test specimen was subjected to elongation at the rate of 2 mm/min up to a strain of 200%. The strain of 200% was subsequently maintained for 1 hour. At the end of this time, the test specimen was detached from the jaws and then left standing at 25° C. for 12 hours. The distance between the two lines was then again measured in the same way as above.

Distance between lines before elongation: 12.5 mm Distance between lines after elongation: 12.9 mm, i.e. a set of 3%.

Tests on self-repairing at 25° C. were carried out as follows: the test specimen was first cut at its center using a razor blade. After a time t1, the two surfaces were brought back into contact manually. It was found that they adhered immediately to one another. The test specimen was then left standing for a time t2. At the end of this time, a tensile test was carried out up to breaking under the conditions mentioned above.

The following results were recorded:

| Sample | t1 (min) | t2 (min) | Maximum stress before breaking (MPa) | Elongation at break (%) |
|---|---|---|---|---|
| 1 | 10 | 1 | 0.10 | 189 |
| 2 | 10 | 3 | 0.16 | 234 |
| 3 | 10 | 14 | 0.19 | 280 |

This example shows that, after self-repairing, the sample was again capable of withstanding considerable strains before breaking. This example also shows that the quality of the self-repairing improves as the time t2 increases.

Example 7 (Comparative)

Synthesis and Mechanical Properties of a Material 3.82 g of Araldite® LY556 epoxy resin+5.60 g of Unidyme® 60 acid trimer were placed in a 100 ml round-bottomed flask equipped with a magnetic stirrer and a heating bath. The mixture was heated at 160° C. with stirring until it had become miscible, was then poured into a PTFE mold with a diameter of 80 mm and, finally, was placed in an oven at 125° C. for 48 hours. A flexible film having a thickness of approximately 1.35 mm was obtained. The following were found by infrared spectroscopy:
  the disappearance of the $v_{C=O}$ band of the acid at 1707 $cm^{-1}$
  the disappearance of the $v_a$ band of the epoxy at 914 $cm^{-1}$
  the appearance of the $v_{C=O}$ band of the ester at 1736 $cm^{-1}$
The mechanical tests were carried out on this film under the same conditions as above.
The tensile test gave the following results:
Elongation at break: 195%
Breaking stress: 5.5 MPa
A test on self-repairing at 25° C. was carried out in the same way as in example 6.
The following results were recorded with the times $t_1$=10 minutes and $t_2$=3 hours:
Elongation at break: 5.1%
Maximum strain before breaking: 0.07 MPa.
This example shows that the property of self-repairing is not observed in the case of a network composed of chemically crosslinked macromolecules but devoid of intermolecular hydrogen bonds.

Example 8

Synthesis and Mechanical Properties of a Material According to the Invention 150 g of Pripol® 1040 (source Uniqema, acid number=188, i.e. 0.504 mol of acid functional groups) were introduced into a 500 ml Schott reactor equipped with a mechanical stirrer, a reflux condenser, a Dean & Stark apparatus, a nitrogen inlet, a dropping funnel and a temperature probe. After heating to 80° C., 36.5 g of UDETA (source Arkema, base number=6.9 meq/g, i.e. 0.252 mol of amine functional groups) were introduced via the dropping funnel. After heating at 160° C. for 5 hours under a stream of nitrogen, the water formed was removed in the Dean & Stark apparatus. The temperature was then allowed to come back down to 145° C., 62.9 g of epoxidized soybean oil (Ecepox PB1, source Arkema, epoxide number=4 mmol/g, i.e. 0.252 mol of epoxide functional groups) were then added and the mixture was left to react at 145-150° C. for 15 minutes. The reaction mixture was poured onto a Teflon® plate, which was placed in an oven at 120° C. for 40 hours.

The product thus obtained was dusted over with talc in order to make it possible to better handle it and remove it from the plate. Once the product had been removed from the mold, the other surface (the one in contact with the plate) was treated with talc in its turn. Strips with a length of 8 cm, a width of 1 cm and a thickness of 2 mm were cut out for the purpose of carrying out mechanical tests. Pencil marks separated by 4 cm were made on the sample (2 cm from each side of the center in length). The sample was subsequently strained manually until the marks were separated by 14 cm, which corresponded to a strain of 250%. The sample was placed on a table and its elastic return was observed. 5 minutes after having relaxed the sample, the distance between the marks had returned to 4.2 cm. Half an hour later, the sample had completely recovered its original dimensions and the distance between the marks had returned to 4 cm, which corresponded to 0% set.

This example illustrates the elastomeric properties of the materials according to the invention.

Example 9

Shock-Absorbing Properties of a Material According to the Invention

Measurement of the damping behavior of the product obtained according to example 4 (HR) and of the product obtained according to example 5 (HM) according to Tan Delta at 150 Hz (high frequency representative of the stress encountered by a material during the dropping of an object at its surface).

The measurements of the dynamic mechanical moduli which make it possible to calculate tan delta as the ratio G"/G' were carried out using a DMA Q800 from TA Instruments; the tests were carried out under shear conditions, from 80° C. to 0° C., while cooling at 2° C./min.

The result of this measurement is presented in FIG. 1.

It is found that, from −7° C. up to at least 80° C., the product according to example 5 (HM) exhibits a tangent delta of greater than 0.5. For the product according to example 4 (HR), the tangent delta is greater than 0.5 from 9° C. up to at least 80° C.

The invention claimed is:

1. A method of making a cured material having shock absorbing properties which comprises
    forming the cured material, said cured material comprising arborescent molecules each composed of at least bifunctional fragments and of at least trifunctional fragments joined to one another via ester or thioester bridges, alone or in combination with amide or urea bridges, said bridges being formed from two functional groups carried by different fragments, said molecules additionally comprising, on the fragments situated at the ends of the arborescences, end associative groups capable of combining with one another via hydrogen bonds and connected covalently to the functional groups not participating in said bridges, by
    (a) reacting at least one at least trifunctional compound (A) carrying first and second functional groups with at least one compound (B) carrying, on the one hand, at least one reactive group capable of reacting with the first functional groups of (A) and, on the other hand, at least one associative group, in a ratio by number of the reactive groups of the compound (B) to the sum of the first functional groups of the compound (A) ranging from 0.1:1 to 0.8:1 to obtain an intermediate compound;
    (b) reacting the intermediate compound obtained in stage (a) with at least one at least bifunctional compound (C), the functional groups of which are capable of reacting with the second functional groups of the compound (A) in order to form ester or thioester bridges, alone or in combination with amide or urea bridges, to obtain a product, and
    (c) curing the product of stage (b) to obtain the cured material.

2. The method as claimed in claim 1, wherein a fraction of the arborescent molecules is insoluble.

3. The method as claimed in claim 1, wherein the soluble fraction of said arborescent molecules has a number-average molecular weight of between 300 and 300 000 g/mol.

4. The method as claimed in claim 1, wherein said arborescent molecules each additionally comprise $C_6$-$C_{20}$ alkyl chains.

5. The method as claimed in claim 1, wherein the material includes at least 25% by number of said arborescent molecules.

6. The method as claimed in claim 1, wherein the associative groups are selected from the group consisting of imidazolidonyl, triazolyl, triazinyl, bis-ureyl, and ureido-pyrimidyl groups.

7. The method as claimed in claim 1, wherein:
    the compound (A) carries at least three identical or different functional groups selected from the group consisting of acid, ester and acyl chloride functional groups,
    the compound (B) carries at least one reactive group selected from the group consisting of alcohol, and primary or secondary amine groups, and
    the compound (C) carries at least two identical or different functional groups selected from the group consisting of epoxy, alcohol and amine functional groups.

8. The method as claimed in claim 1, wherein the compound (A) is a trimer of fatty acid of vegetable origin.

9. The method as claimed in claim 1, wherein the compound (B) corresponds to the formula (B1), (B2) or (B3):

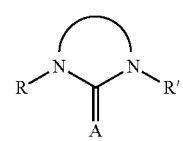

(B1)

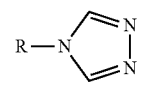

(B2)

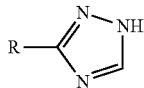

(B3)

wherein

R denotes a unit comprising at least one alcohol or primary or secondary amine group, R' denotes a hydrogen atom, and A denotes an oxygen or sulfur atom or an NH group, preferably an oxygen atom.

10. The method as claimed in claim 7, wherein the compound (B) is selected from the group consisting of: (2-aminoethyl)imidazolidone (UDETA), 1-(2-[(2-aminoethyl)amino]ethyl)imidazolidone (UTETA), 1-[2-({2-[(2-aminoethyl)amino]ethyl}amino)ethyl]imidazolidone (UTEPA), 3-amino-1,2,4-triazole, and 4-amino-1,2,4-triazole.

11. The method as claimed in claim 7, wherein the compound (C) is selected from the group consisting of: bisphenol A diglycidyl ether, bisphenol F diglycidyl ether, tetrabromohisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, polytetramethylene glycol diglycidyl ether, resorcinol diglycidyl ether, neopentyl glycol diglycidyl ether, bisphenol A polyethylene glycol diglycidyl ether, bisphenol A polypropylene glycol diglycidyl ether, terephthalic acid diglycidyl ester, castor oil triglycidyl ether, 1,1,1-tris(hydroxymethyl)propane triglycidyl ether, trisphenol triglycidyl ether, glycerol triglycidyl ether, glycerol propoxylate triglycidyl ether, glycerol ethoxylate triglycidyl ether, trimethylolpropane triglycidyl ether, sorbitol polyglycidyl ether, polyglycerol polyglycidyl ether, pentaerythritol polyglycidyl ether, poly(glycidyl acrylate), polyglycidyl methacrylate, epoxidized polyunsaturated fatty acids, epoxidized vegetable oils, epoxidized fish oils, epoxidized limonene, and mixtures thereof.

12. The method as claimed in claim 7, wherein the compound (C) is selected from the group consisting of: ethylene glycol, propylene glycol, tetramethylene glycol, hexamethylene glycol, octanediol, nonanediol, decanediol, diethylene glycol, dipropylene glycol, triethylene glycol, tetraethylene glycol, polyethylene glycol, polypropylene glycol, polytetramethylene glycol, polyesters comprising hydroxyl ends, polybutadienes comprising hydroxyl ends, polydimethylsiloxanes comprising hydroxyl ends, polyisobutylenes comprising hydroxyl ends, polybutadiene-co-acrylonitrile copolymers comprising hydroxyl ends, dimer diols resulting from fatty acids, and mixtures thereof.

13. The method as claimed in claim 1, wherein the material is provided in or in the form of an object selected from the group consisting of bumpers and fenders for ground vehicles, in particular trains, trucks, cars or carriages, including forklift trucks, guards for boats, play mats, bulletproof jackets, shooting targets, in particular for arrows, bullets and darts, sports protective gear, in particular leg guards, elbow guards and gloves, linings for one-piece sports clothing and protective helmets, protective components for pipes and piping, and acoustic blankets.

14. A cured material made by the method of claim 1.

15. An object which comprises the cured material according to claim 14.

16. The method as claimed in claim 1, wherein said arborescent molecules each additionally comprise $C_6$-$C_{20}$ alkyl chains in a greater number than said end associative groups.

17. The method as claimed in claim 1, wherein the material includes at least 50% by number of said arborescent molecules.

18. The method of claim 1, wherein the material is cured at a temperature of 120° C. to 150° C. for a time period of 1 hour to 48 hours.

19. The method as claimed in claim 1, wherein the material has a tangent delta greater than 0.5, at a frequency of at least 50 Hz, over a temperature range extending from 20 to 50° C.

20. The method as claimed in claim 18, wherein the material is cured at a temperature of 120° C. for 24 hours.

* * * * *

UNITED STATES PATENT AND TRADEMARK OFFICE
CERTIFICATE OF CORRECTION

| | | |
|---|---|---|
| PATENT NO. | : 8,975,363 B2 | Page 1 of 1 |
| APPLICATION NO. | : 13/254282 | |
| DATED | : March 10, 2015 | |
| INVENTOR(S) | : Manuel Hidalgo et al. | |

It is certified that error appears in the above-identified patent and that said Letters Patent is hereby corrected as shown below:

Title Page (75) please correct the name of the inventor from "Bruno Hemelryck" to -- Bruno Van Hemelryck --.

Signed and Sealed this
Ninth Day of February, 2016

Michelle K. Lee
*Director of the United States Patent and Trademark Office*